Jan. 15, 1963  C. D. STEPHENSON  3,073,451
ENGINE OIL FILTER INDICATOR SYSTEMS
Filed April 18, 1960  2 Sheets-Sheet 1

INVENTOR.
Clair D. Stephenson
BY
George E. Johnson
ATTORNEY

Jan. 15, 1963 C. D. STEPHENSON 3,073,451
ENGINE OIL FILTER INDICATOR SYSTEMS
Filed April 18, 1960 2 Sheets-Sheet 2

INVENTOR.
Clair D. Stephenson
BY George E. Johnson
ATTORNEY

United States Patent Office 3,073,451
Patented Jan. 15, 1963

3,073,451
ENGINE OIL FILTER INDICATOR SYSTEMS
Clair D. Stephenson, Flushing, Mich., assignor to General Motors Corporation, Detroit, Mich., a corporation of Delaware
Filed Apr. 18, 1960, Ser. No. 23,012
5 Claims. (Cl. 210—85)

This invention relates to filter systems and more particularly to engine oil filtering systems including indicators showing the condition of the filters employed.

Heretofore, it has been the practice of automobile owners periodically to replace filter elements regularly or as the need is determined by visibly observing the condition of the oil. Obviously, in regularly changing the filter elements it may be done prematurely, that is, before they have outlived their usefulness or too late when the filter elements have become so plugged with impurities that the lubricating of the engines served is unsatisfactory. There have been developments which depended upon the pressure of the oil or its temperature particular in the zone of the filtering medium to actuate a signal to warn the operator that the filter element needed changing. Unfortunately, such devices have involved the use of parts moving in contactual relation with the oil. In the course of time, the oil would leave gummy deposits on those parts and the desired signals could not be relied upon to occur when the proper occasions arose.

An object of the present invention is to provide an improved engine oil filter indicator system the operativeness of which is reliable despite the gummy deposits likely to be associated with engine oil.

A feature of the present invention is an engine oil filtering system having thermally responsive switch means with no moving parts in contact with the oil and the switch means being associated with a filter in such a way that the temperature of the oil serves as an indication of the filter condition.

These and other important features of the invention will now be described in detail in the specification and then pointed out more particularly in the appended claims.

Normally open or closed switches which are thermally responsive to operate are conventional in many types of installation. Heretofore, however, switches of this type have not been used successfully in detecting blockage of lubricating oil filters as moving parts of such switches become gummed by the oil. Switches in which moving parts are shielded from the medium have now been found, in developing the present invention, to be reliable and therefore extremely effective in the oil filtering field. Switches of this type, by way of example, are illustrated in the United States Patent 2,750,475, granted June 12, 1956, in the name of B. H. Clason. Any type of switch means with operative parts shielded from contact with the oil may be used in carrying out the present invention but the shield must be able to transfer heat from the oil to the operative parts of the switch.

Figure 1:
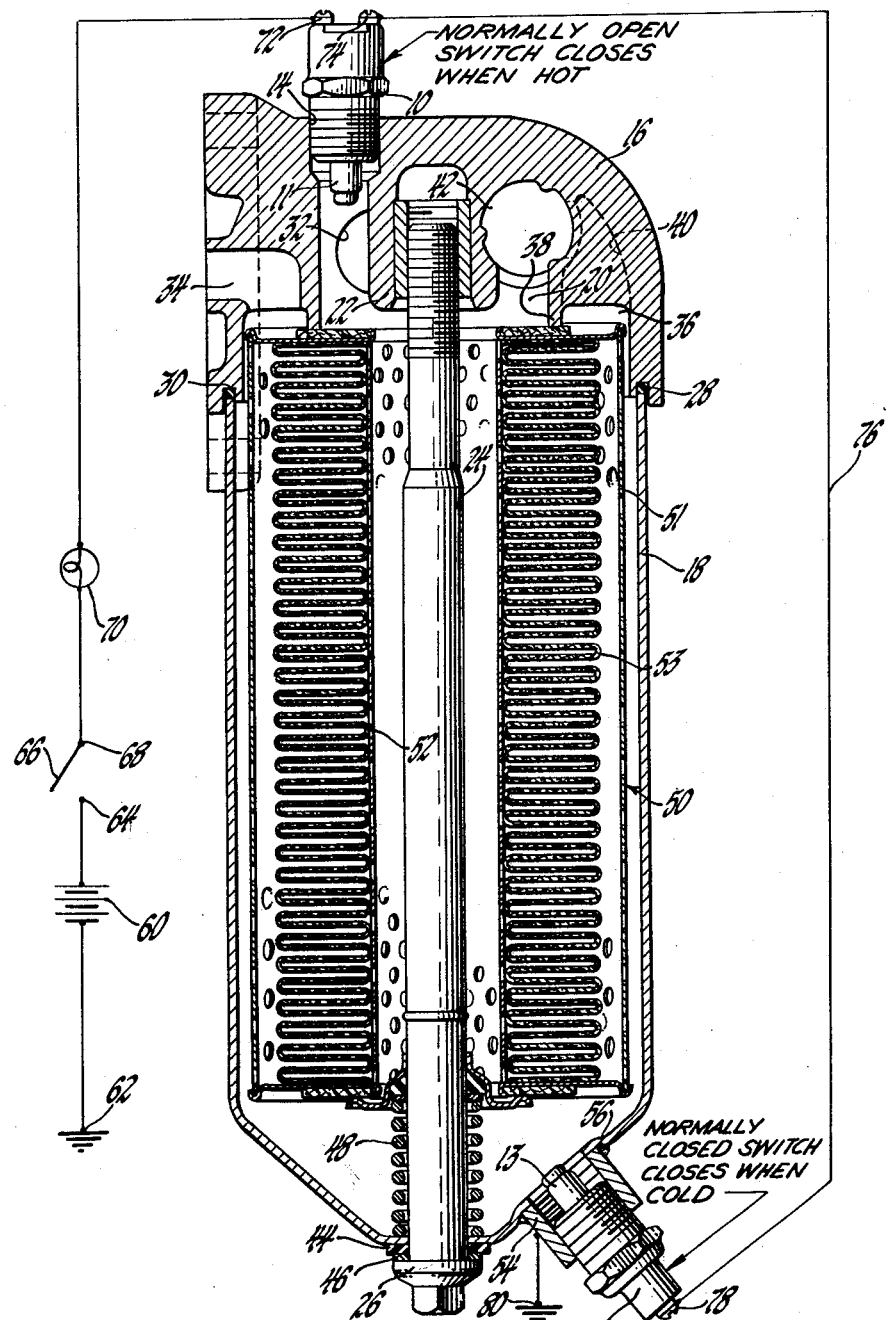
FIGURE 1 is a sectional view of an oil filtering arrangement arranged in combination with a diagrammatic representation of a signal circuit.

In FIGURE 1 of the drawings, thermally responsive switches of the above-mentioned type are depicted at 10 and 12. The switch 10 is a normally open switch having a fixed shield 11 protecting its moving parts. It is adapted to close its contacts when hot. It is threadedly mounted within an opening 14 formed in a support casting 16 for a filter casing. The latter is in the form of a cup 18 and the casting 16 cooperating to constitute the filter casing. The opening 14 in the casting 16 communicates with an annular outlet passage 20. This passage surrounds a projection 22 depending from the inner top side of the casting 16 and arranged threadedly to support a vertical shaft 24 bearing a head 26 at its bottom. The latter serves to hold the cup 18 into engagement with a sealing washer 28 embedded in a recess 30 formed in the under side of the casting 16. An outlet 32 is also formed in the casting 16 and communicates with the annular outlet chamber 20. A right angle passage 34 is formed in the casting 16 and communicates with an annular inverted trough 36 which is separated from the annular chamber 20 by an annular lip 38. A by-pass 40 is shown in dotted lines in FIGURE 1 and is designed to give communication between the annular chambers 36 and 20 as controlled by spring-loaded by-pass valve 42. By-pass arrangements of this type are well-known in the filter art, the direction of flow being from the trough 36 to the chamber 20 if pressure should build up in the trough 36.

Interposed between the bottom end of the cup 18 and the head 26 are a sealing washer 44 of resilient material and a metal washer 46. A helical spring 48 is arranged within the cup urging a filter element generally indicated at 50 upwardly and into sealing engagement with the annular lip 38 of the casting 16.

Details regarding the filter element 50 are not essential for an understanding of the present invention but it suffices to say that outer and inner concentric walls 51 and 52 of the element are perforated to permit inward flow of fuel oil through pleated fibrous material 53. After the oil has been clarified by passing through the filter material, it is caused to go upwardly around the shaft 24 in its normal path and be discharged by way of the passage 20 and the outlet 32 to the point of use.

A boss 54 is welded as at 56 to the bottom wall of the cup 18 and is internally threaded for the reception of the thermal switch 12 which is like switch 10 except that it has normally closed contacts and only one instead of two terminals. Its moving parts are protected from the oil by a fixed heat transfer shield 13.

A voltage source in the from of a battery is shown at 60 and this battery is grounded as at 62. The other side of the battery is connected to one pole 64 of an ignition switch 66. The other pole 68 of the switch is connected through an indicator lamp 70, to one terminal 72 of the switch 10. The other terminal 74 of the switch 10 is connected by a line 76 to the one terminal 78 of the switch 12. The latter is grounded as diagrammatically illustrated at 80 as will be understood.

In the operation of the system shown in FIGURE 1, it will be understood that when the ignition switch 66 is closed and the engine being served is started, the engine oil will be cold and as a result, engine oil entering the inlet 34 will be cold. When leaving the outlet 32 after clarification, it will still be cold and as a result, the switch 10 contacts will be open and although the contacts of switch 12 will be closed, no current will pass through the lamp 70—hence that tell-tale lamp will be out.

When the engine oil becomes heated or at engine operating temperature, the oil in the annular passage 20 closes the contacts of the switch 10 but at this time the contacts of the switch 12 will be open and, therefore, the tell-tale lamp 70 will remain out.

Assuming, however, that the filter element 50 has become plugged with contaminate, it then follows that pressure will develop around the element 50 and the heated oil will flow through the by-pass 40 into the passage 20 without passing through the filter element as normally required. This heats only the switch 10 with the result that switch 12 becomes cold and closes. With both switches then closed, the tell-tale light 70 will glow and indicate that a change of the filter element 50 is necessary.

In FIGURE 2, we again have the casting 16 and the cup 18 making up a filter casing and again a normally open switch 10 is employed in the outlet portion of the filter arrangement and a normally closed switch 12 is employed at the bottom of the filter casing. In this situation, however, the tell-tale lamp 70 is supplemented by an engine oil pressure actuated switch 90 having two sets 92 and 94 of normally open contacts which may be opened when engine oil pressure has been attained. Between the ignition switch 66 and the lamp 70 is tapped a line 96 leading through a tell-tale lamp 98 by way of the set 92 of oil pressure switch contacts. The set of contacts 94 are connected across the two terminals 72 and 74 of the switch 10 as indicated.

Figure 2:
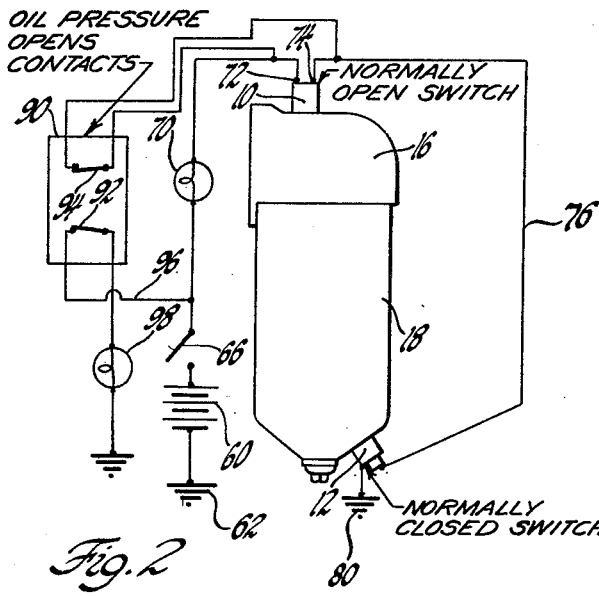
FIGURE 2 is a diagrammatic representation of an arrangement such as shown in FIGURE 1, but in combination with an engine oil pressure signal system.

In the arrangement of FIGURE 2, with the ignition switch 66 closed and no oil pressure being attained, the set 92 of contacts will be closed and the oil pressure tell-tale lamp 98 will light up. At this time, the set 94 of oil pressure switch contacts will also be closed and although the switch 10 is open, the switch 12 will be closed and the filter tell-tale lamp 70 will light up. This constitutes a double warning of a harmful condition i.e.—although the filter unit is cold, both lamps 70 and 98 will light up and give two warning signals that something is wrong such as a condition of no oil.

After the engine has operated and the oil pressure and temperature have become normal, the sets 92 and 94 of oil pressure contacts will open and both tell-tale lamps 70 and 98 will be out. If the engine oil is cold, the switch 10 will be open and the switch 12 will be closed so that the filter tell-tale lamp 70 remains out. If the engine oil is hot, the switch 10 becomes closed but the switch 12 will open so that filter tell-tale lamp again remains out. If the filter element of FIGURE 2 becomes plugged, oil will flow through the by-pass heating only the switch 10 with the result that switch 12 becomes cool and closes. With both switches 10 and 12 closed, the tell-tale lamp 70 will light and indicate that the filter element should be changed. If there is an oil pressure drop and the filter element is not plugged, the oil pressure switch 90 closes its contacts lighting the oil pressure tell-tale lamp 98. If the oil pressure drops and the filter element is plugged then the oil pressure switch closes, lighting the oil pressure tell-tale lamp 98 and the switch 12 closes causing the lamp 70 to indicate that a filter change is needed.

Figure 3:
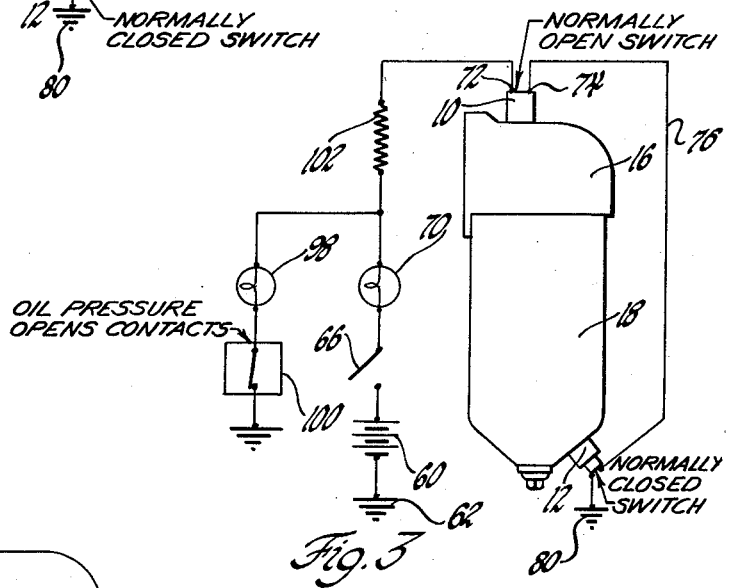
FIGURE 3 is a representation similar to that of FIGURE 2 but incorporating a resistance element and a different oil pressure switch.

In FIGURE 3, the same elements are employed as in FIGURE 2 except for the tell-tale lamp circuits. In this case, the ignition switch 66 and the filter tell-tale lamp 70 are connected in series with an oil pressure tell-tale lamp 98 and an oil pressure operated switch 100 having normally closed contacts opened by engine oil pressure. A resistance 102 is connected between a junction of the two lamps and the terminal 72 of the switch 10. In this arrangement, with the ignition switch 66 closed and there being no oil pressure, the oil pressure tell-tale lamp 98 and the change filter tell-tale lamp 70 will both be illuminated. After the engine has operated and the oil pressure and temperature are normal, the pressure switch 100 will open and both lamps 70 and 98 will be out. With the engine oil cold, switch 10 will be open, switch 12 will be closed and the filter tell-tale lamp 70 will be out. With the engine oil hot, the switch 10 will be closed, the switch 12 will be open and the lamp 70 will be out. If the filter element is plugged, however, the oil will flow through the by-pass heating only the switch 10 and therefore the switch 12 will close and with both switches 10 and 12 closed, the filter tell-tale lamp 70 will indicate a filter change is needed. If the oil pressure should drop, the oil pressure switch 100 will close lighting both lamps 70 and 98.

Figure 4:
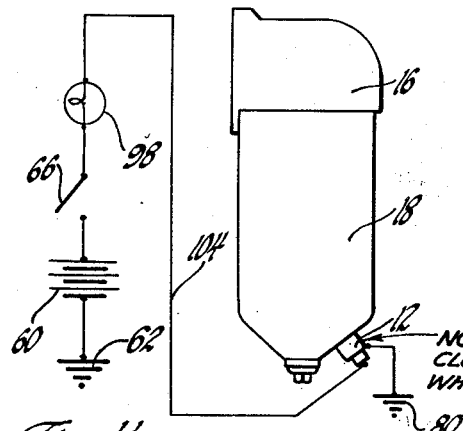
FIGURE 4 is a simplified diagrammatic representation similar to that of FIGURE 1 but using only one thermally responsive switch in an indicator circuit.

The simplest arrangement is shown in FIGURE 4 in which only one thermally responsive switch 12 is employed and this switch has normally closed contacts. This switch is located at the bottom of the filter casing and one of its contacts is connected by a line 104 to a filter change tell-tale lamp 98 in turn supplied by current from a voltage source 60 through an ignition switch 66. In this arrangement, when the ignition switch 66 is closed and the engine is started and the engine oil is cold, the switch 12 will be closed and the lamp 98 will lit. This may be taken to indicate that strenuous engine operation should not be engaged in. When the engine oil becomes heated and in normal operating condition, the switch 12 will open and the lamp 98 will go out giving more latitude in operating the engine. If the filter element becomes plugged, then the oil will flow through the by-pass and the switch 12 will become cold and closes with the result that the light 98 will indicate a change of the filter element is needed.

In each arrangement no moving parts are located in the oil being handled so the contacts remain clean and ready for service.

I claim:

1. An engine oil filter indicator system including a casing, a filter element in said casing, a normal path for engine oil within said casing leading through said filter element, a by-pass leading around said filter element and controlled by a pressure actuated valve, two thermally responsive switches mounted on said casing adjacent opposite ends of said filter element, each of said switches having a heat transfer surface fixed in position on said casing and adapted to contact oil flowing in said normal path, one of said switches being near the beginning of said path and closed when cold, the other being near the end of said path and open when cold, and an indicating circuit including a voltage source, a signal device and said switches connected in series.

2. An engine oil filter indicator system including a casing, a filter element in said casing, a normal path for engine oil within said casing and leading through said filter element, a by-pass for a portion of said normal path and controlled by a pressure actuated valve, a first thermally responsive switch with closed contacts during normal operating conditions and mounted at the upper end of said casing and separated from said path by a heat transfer shield at the downstream side of said filter element, a second thermally responsive switch with open contacts during normal operating conditions and mounted on the lower end of said casing and also having a heat transfer shield at the upstream side of said filter element, a lubricating oil pressure switch with two sets of normally closed contacts, a pressure signal device, a filter tell-tale signal device, a voltage source, a circuit connecting said voltage source, filter tell-tale signal device and thermally responsive switches in series, a second circuit connecting said voltage source and said pressure signal device and one set of contacts and said pressure switch in series, and the second set of pressure switch contacts being connected in parallel with said first thermally responsive switch.

3. An engine oil filter indicator system including a casing, a filter element in said casing, an inlet to and an outlet from said casing, a normal path for engine oil within said casing leading from said inlet and through said filter element to said outlet, a bypass leading from said inlet and around said filter element to said outlet, pressure actuated means in said bypass and arranged to open upon an increase in pressure in said inlet, two thermally responsive switches each having a heat transfer surface fixed in position as a shield against oil in said casing, one of said switches being mounted on the inlet side of said filter element and being closed when cold and open when hot, the other of said switches being mounted on the outlet side of said filter element and open when cold and closed when hot, an indicating circuit including a voltage source, a signal device and said switches connected in series.

4. An engine oil filter indicator system including a casing, a filter element in said casing, an inlet to and an outlet from said casing, the said casing and filter element being arranged to define a flow path for oil from said inlet through said filter element and to said outlet, a pressure actuated bypass connecting said inlet to said outlet, two thermally responsive switches each having contacts shielded from said path by a heat transfer surface, one of said switches being mounted with its heat transfer surface on the upstream side of said filter element with its contacts closed when cold and open when hot, the second of said switches being mounted with its heat transfer surface on the downstream side of said filter element with its contacts open when cold and closed when hot, an indicating circuit including a voltage source, a signal device and said switches connected in series, and the system being such that if all oil in said flow path is cold the signal device will not operate and if the said filter becomes clogged the bypass will open and the contacts of said second switch will close completing the circuit.

5. An engine oil filter indicator system including a casing, a filter element in said casing, a normal path for engine oil within said casing leading through said filter element, pressure controlled bypass means arranged to divert oil from said normal path and around said filter element, a thermally responsive switch mounted at each end of said casing and having a heat transfer surface fixed contiguously to said path, one of said switches being normally open and the other being normally closed at below operating temperatures, two indicating devices, a normally closed pressure switch, an ignition switch, a voltage source, a resistance, a circuit including said ignition switch, one of said indicator devices, the said resistance and said thermally responsive switches in series with said voltage source, and the contacts of said pressure switch and the other of said signal devices being connected in parallel with said resistance and said thermal responsive switches.

References Cited in the file of this patent
UNITED STATES PATENTS

| | | |
|---|---|---|
| 2,544,269 | Le Clair | Mar. 6, 1951 |
| 2,729,339 | McCoy | Jan. 3, 1956 |
| 2,750,475 | Clason | June 12, 1956 |
| 2,757,801 | Muggli et al. | Aug. 7, 1956 |

FOREIGN PATENTS

| | | |
|---|---|---|
| 963,483 | Germany | May 9, 1957 |